United States Patent
Haslam et al.

(10) Patent No.: US 7,337,198 B1
(45) Date of Patent: Feb. 26, 2008

(54) IN-PLACE PRESERVATION OF FILE SYSTEM OBJECTS DURING A DISK CLONE OPERATION

(75) Inventors: Andrew P. Haslam, Western Springs (NZ); Nigel Pattinson, Auckland Central (NZ); Charles Truell, Mt. Eden (NZ); Andrew L. Paxie, Sandringham (NZ); Abraham Dowd, Western Springs (NZ)

(73) Assignee: Symantec Corporation, Cupertino, CA (US)

( * ) Notice: Subject to any disclaimer, the term of this patent is extended or adjusted under 35 U.S.C. 154(b) by 592 days.

(21) Appl. No.: 10/776,445

(22) Filed: Feb. 10, 2004

(51) Int. Cl.
G06F 17/00 (2006.01)

(52) U.S. Cl. .................. 707/204; 707/205; 711/162

(58) Field of Classification Search .............. 707/204, 707/205; 711/112, 154, 162
See application file for complete search history.

(56) References Cited

U.S. PATENT DOCUMENTS

| | | | | |
|---|---|---|---|---|
| 5,435,004 A | * | 7/1995 | Cox et al. | 707/205 |
| 5,634,124 A | * | 5/1997 | Khoyi et al. | 707/103 R |
| 5,761,678 A | * | 6/1998 | Bendert et al. | 707/204 |
| 6,108,697 A | * | 8/2000 | Raymond et al. | 709/218 |
| 6,179,492 B1 | * | 1/2001 | Guy et al. | 717/169 |
| 6,216,175 B1 | * | 4/2001 | Sliger et al. | 717/169 |
| 6,594,743 B1 | * | 7/2003 | Chen et al. | 711/162 |
| 6,618,736 B1 | * | 9/2003 | Menage | 707/204 |
| 6,684,226 B1 | * | 1/2004 | Bodilsen | 707/203 |
| 7,072,915 B2 | * | 7/2006 | Kaczmarski et al. | 707/204 |
| 7,133,985 B1 | * | 11/2006 | Haase et al. | 711/162 |
| 2003/0220948 A1 | * | 11/2003 | Green et al. | 707/204 |

* cited by examiner

*Primary Examiner*—Uyen Le
(74) *Attorney, Agent, or Firm*—Fenwick & West LLP

(57) ABSTRACT

A cloning manager preserves in-place file system objects during a clone operation. The cloning manager determines boundaries on a target storage medium to contain a resultant file system to be created by the clone operation, and identifies at least one protected area within the boundaries to be overwritten by the clone operation. The cloning manager also identifies at least one in-place file system object at least partially within the boundaries not to be overwritten during the clone operation. The cloning manager ensures that each in-place file system object is not located in a protected area, shifting the objects as necessary. The cloning manager performs the clone operation, creating the resultant file system only in locations within the boundaries in which no in-place file system object is located.

36 Claims, 4 Drawing Sheets

US 7,337,198 B1

IN-PLACE PRESERVATION OF FILE SYSTEM OBJECTS DURING A DISK CLONE OPERATION

TECHNICAL FIELD

This invention pertains generally to computer file system operations, and more specifically to in-place preservation of files during disk cloning operations.

BACKGROUND ART

File system cloning is an improvement over traditional file copy and back-up operations. During a file system clone, the data underlying an existing file system are examined at the physical media layout level, and a stream of data is created representing that file system. A new file system is then created by initializing and modifying low level file system structures directly on a target physical medium. Because it operates at a lower level, a cloning operation is more efficient than traditional file copying operations. Additionally, cloning operations can leverage knowledge of physical media architecture, and can access file system metadata.

Cloning is a destructive process, which overwrites whatever content may happen to be in the target region of the physical media, by laying down a new file system thereon. Although cloning is an efficient way in which to create a new file system with the content and attributes of an existing one, as it exists in the prior art cloning cannot preserve files or directories that are already in-place on the target media.

Traditionally, in-place files have been preserved during destructive operations by moving the files to a different physical location for the duration of the operation. After the successful completion of the operation, the files are restored. Copying the files to a secondary storage medium and then restoring them after a destructive operation requires time. Where the number of files is significant, or where individual files are very large, the required time becomes substantial, as does the free space requirement on the secondary storage medium. Additionally, this technique requires an accessible secondary storage medium.

What is needed are methods, computer readable media and systems that provide preservation of in-place file system objects during cloning operations.

DISCLOSURE OF INVENTION

The present invention comprises methods, systems, and computer readable media for in-place preservation of file system objects (103) during a clone operation. A cloning manager (101) determines boundaries (105) of a file system (107) to be created by the clone operation. The cloning manager (101) identifies at least one protected area (113) within the boundaries (105), reserved for the use of the file system (107) that will be created by the clone operation. The cloning manager (101) also identifies at least one in-place file system object (103) within or overlapping the boundaries (105) to be preserved during the clone operation. The cloning manager (101) stores, in a location that will not be affected by the clone operation, metadata (117) concerning each in-place file system object (103) within or overlapping the boundaries (105) to be preserved during the clone operation. The cloning manager (101) ensures that each in-place file system object (103) within or overlapping the boundaries (105) to be preserved during the clone operation is not located in a protected area (113), moving (203) the objects (103) as necessary. The cloning manager (101) proceeds to create the file system (107) during the clone operation only in locations that do not contain in-place file system objects (103) to be preserved.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF PREFERRED EMBODIMENTS

Figure 1:
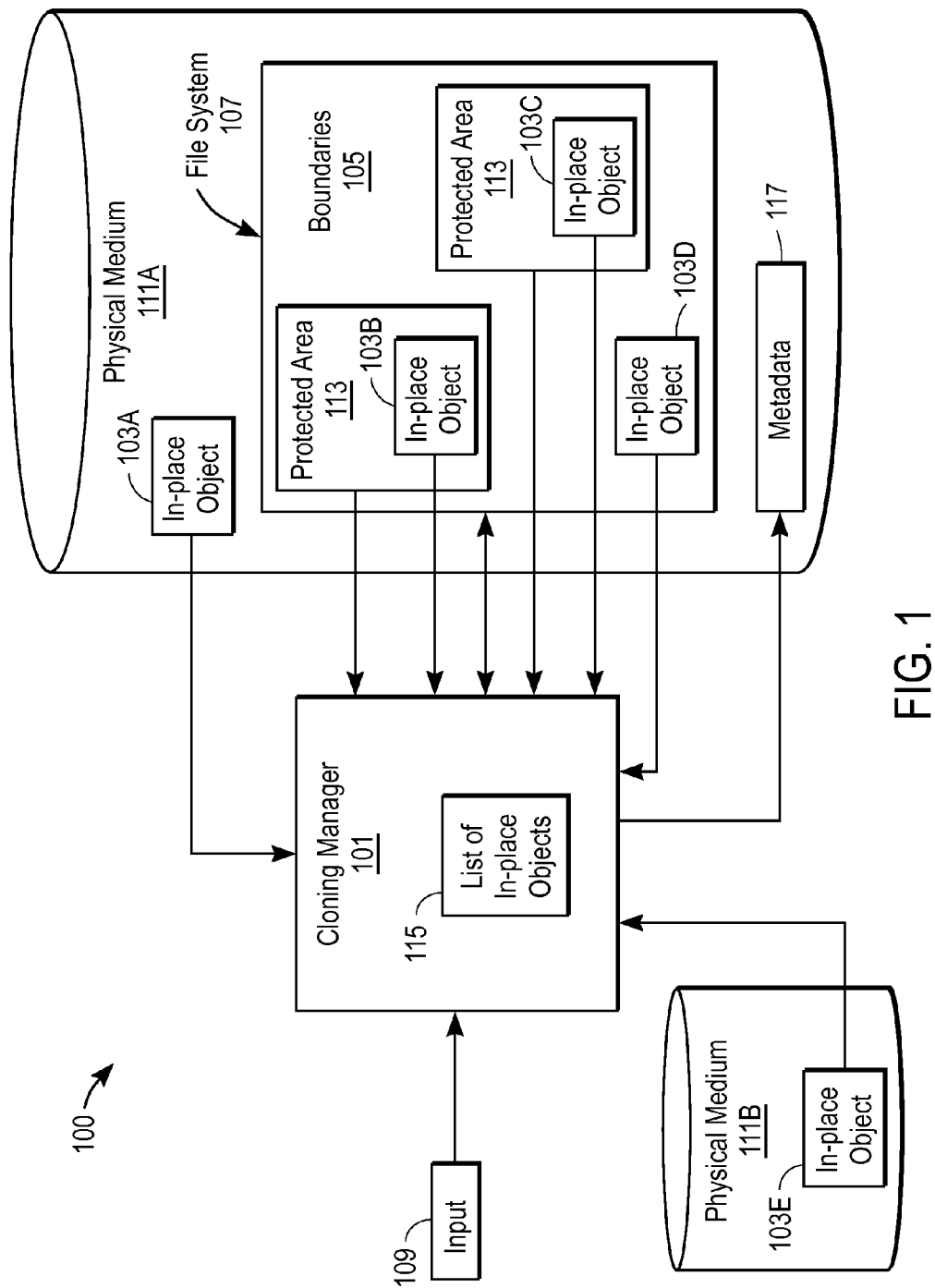
FIG. 1 is a block diagram illustrating a high level overview of a system for practicing some embodiments of the present invention.

FIG. 1 illustrates a high level overview of a system 100 for practicing some embodiments of the present invention. A cloning manager 101 preserves in-place file system objects 103 (e.g., files, directories) during a clone operation. It is to be understood that although the cloning manager 101 is illustrated as a single entity, as the term is used herein a cloning manager 101 refers to a collection of functionalities which can be implemented as software, hardware, firmware or any combination of these. Where a cloning manager 101 is implemented as software, it can be implemented as a standalone program, but can also be implemented in other ways, for example as part of a larger program, as a plurality of separate programs, or as one or more statically or dynamically linked libraries.

The cloning manager 101 analyzes information concerning a pending clone operation to determine the boundaries 105 of a file system 107 that will result from a successful completion of the operation. Although this specification discusses a single resultant file system 107 for purposes of readability, those of ordinary skill in the art know that clone operations can create multiple file systems 107, depending upon the source that is being cloned. In other embodiments of the present invention, the techniques described herein are applied during the creation of multiple file systems 107 by a clone operation, in a manner which will be readily apparent to those of ordinary skill in the relevant art in light of this specification.

In order to determine the boundaries 105 of the resultant file system 107, the cloning manager 101 can analyze data concerning the clone operation such as the resultant file system 107 type, the location of the resultant file system 107 volume boundaries, the storage geometry that determines the location and geometry of the resultant file system's 107 data area (i.e. sector size, cluster size, cluster base (the location where data clusters start)) and the total number of sectors to be used by the resultant file system 107. The implementation mechanics of analyzing data concerning a pending clone operation to determine the resultant file system's 107 boundaries 105 will be readily apparent to those of ordinary skill in the relevant art in light of this specification. Some data can be gleaned from input 109 to the cloning manager 101 specifying parameters for the cloning operation (e.g., the resultant file system 107 type), and other data can be gleaned by analyzing the received input 109 (e.g., the storage geometry is a function of file system 107 and physical media type 111).

The cloning manager 101 also identifies any protected areas 113 within the boundaries 105 that are to be reserved for the resultant file system 107 itself. Which areas are so protected is a function of file system 107 type. The cloning manager 101 can also identify any protected areas 113 that should optimally but not necessarily be reserved for a file system 107 of the type to be created by the clone operation.

The cloning manager 101 compiles a list 115 of the in-place files and directories (in-place file system objects 103) that require preserving. Typically, the list 115 of in-place file system objects 103 that require preserving is provided to the cloning manager as a directive concerning the clone operation to perform (e.g., as input 109 from a user such as a systems administrator, in a configuration file, etc.). The cloning manager 101 analyzes the file system objects 103 to preserve, and can eliminate any objects 103 from the list 115 that will not be affected by the clone operation. An in-place file system object 103 will not be affected by the clone operation where the object 103E is stored on a physical medium 111B other than the target physical medium 111A for the clone operation. Additionally, an in-place file system object 103A stored on the target physical medium 111A but outside of the boundaries 105 of the resultant file system 107 will not be affected. This can be determined by cross-referencing the in-place object's 103 content locations against the prescribed boundaries 105 of the resultant file system 107.

The cloning manager stores 101, in a location that will not be affected by the clone operation, metadata 117 concerning each in-place file system object 103 within the boundaries 105 to be preserved during the clone operation. The metadata 117 can include information concerning a file system object 103 such as its current path and logical location within the file system to be destroyed by the clone operation, its physical storage location on the underlying physical medium 111 and attributes concerning the object 103 (e.g., ownership, access permissions, hidden/read-only, etc.).

In some embodiments of the present invention, a persistent copy of the metadata 117 concerning in-place file system objects 103 within the boundaries 105 to be preserved during the clone operation is stored in a location that will not be affected by the pending clone operation. In one embodiment, this persistent copy takes the form of two (or more) files containing the metadata 117 describing the preserved objects 103 and the locations of their data. More than one file is used for fault tolerance to ensure that at least one consistent description of the objects 103 and the locations of their contents exists as file locations are shifted, as described below. This persistent and fault tolerant copy of the metadata is then available for use in recovering file system objects should the clone operation fail after the current file system has been overwritten to the point where it is no longer navigable. In other embodiments, other persistent storage mechanisms that provide fault tolerance are used (e.g., a database that supports fault tolerance).

In yet other embodiments, the cloning manager 101 stores the metadata 117 according to a persistent mechanism that does not provide fault tolerance (e.g., a single file on a magnetic or optical medium). In still other embodiments, the cloning manager 101 stores the metadata 117 in random access memory (e.g., for the purposes of speed in non-critical file preservation scenarios). Other metadata 117 storage options will be readily apparent to those of ordinary skill in the relevant art in light of this specification, all of which are within the scope of the present invention.

In some embodiments the cloning manager 101 determines whether the target storage medium 111 is of sufficient size to simultaneously store the resultant file system 107 and each identified in-place file system object 103 to be preserved during the clone operation. To make such a determination, the cloning manager 101 examines the total sectors required by the resultant file system 107, the total sectors reserved by the resultant file system 107 for its own storage requirements, and the size of the in-place file system objects 103 to be preserved during the clone operation.

If the target storage medium 111 is of sufficient size, the cloning manager 101 proceeds with the clone operation. If the target storage medium 111 is not of sufficient size, the cloning manager 101 flags an error condition, which can be processed as desired in various embodiments of the present invention.

Figure 2:
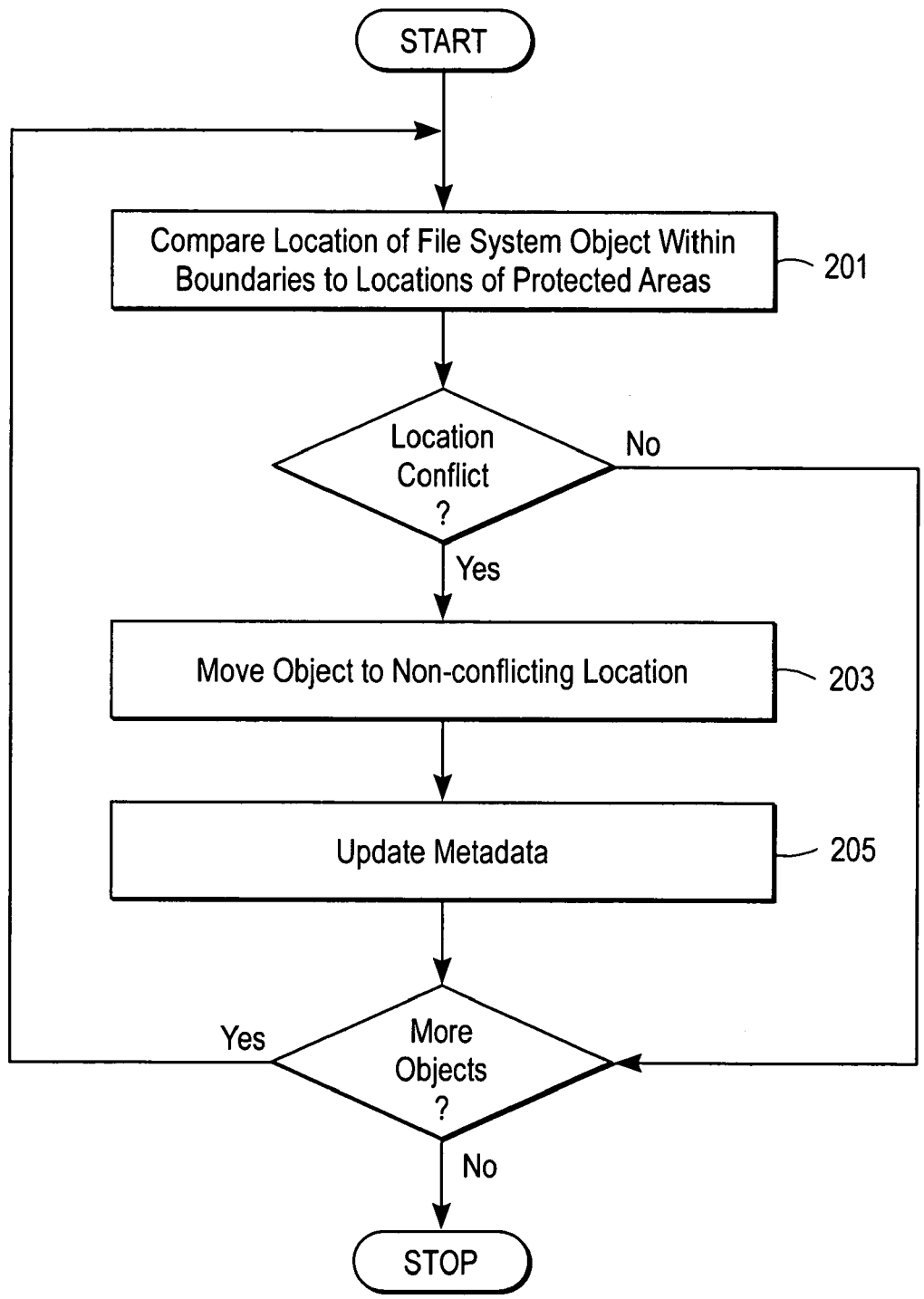
FIG. 2 is a flowchart illustrating steps for ensuring that each in-place file system object to be preserved during the clone operation is not located in a protected area, according to some embodiments of the present invention.

The cloning manager 101 ensures that each in-place file system object 103 within the boundaries 105 to be preserved during the clone operation is not located in a protected area 113, which is reserved for the resultant file system 107. FIG. 2 illustrates this process, according to some embodiments of the present invention. To ensure that each in-place file system object 103 to be preserved during the clone operation is not located in a protected area 113, the cloning manager 101 compares 201 the location of each such file system object 103 to the locations of the identified protected areas 113 reserved for the resultant file system 107. In other words, the cloning manager 101 looks up the location of each file system object 103 within the boundaries 105 to be preserved, in order to determine whether its contents are located in a protected area 113, reserved by the resultant file system 107 for its own use.

Where the cloning manager 101 determines that the location of a file system object 103 to be preserved conflicts with the location of a protected area 113, the cloning manager 101 moves 203 the conflicting file system object 103 to an available non-conflicting location. That is to say, when a location conflict is detected, the cloning manager 101 shifts 203 the conflicting content to a new location that is unused by other content.

When a file system object 103 is moved 203, the cloning manager also updates 205 the stored metadata 117 concerning the file system object 103 accordingly, so as to reflect its new location.

When content has been moved 203 and recorded, the cloning manager can record a "blackout" range that will prevent any further use of this reserved location for other content shifts. The blackout ranges can be released after the content shifting has been completed.

In other embodiments, rather than moving 203 content in response to detecting a location conflict, the cloning manager does not move 203 the content, and instead classifies the location conflict as an error condition. This embodiment can be employed with file system objects 103 that cannot be moved.

Figure 3:
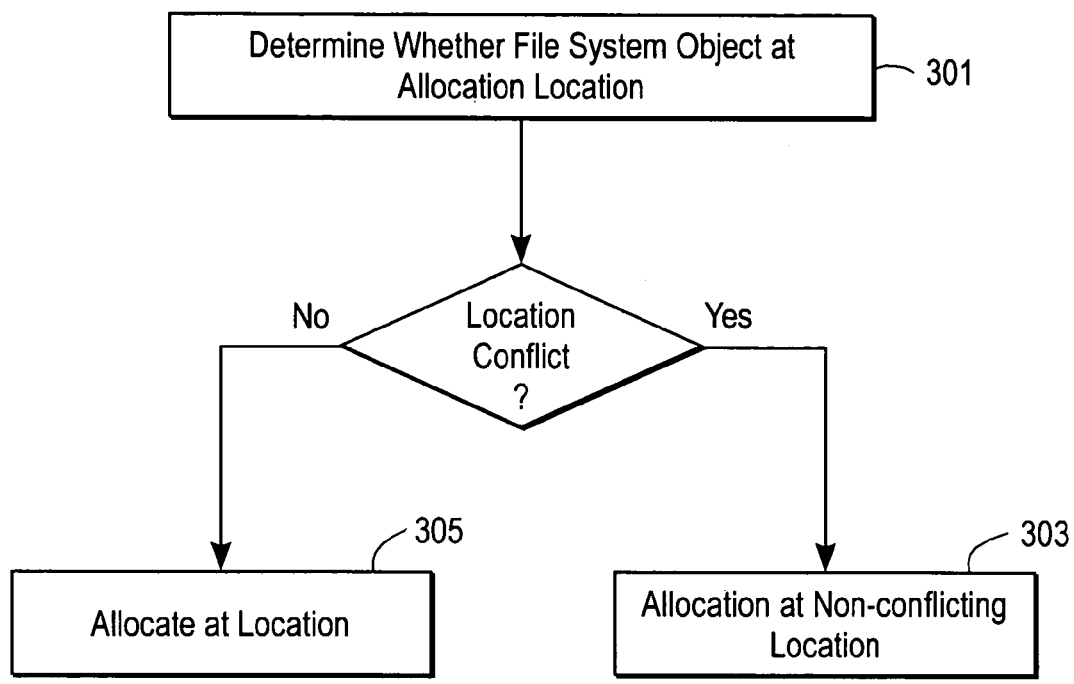
FIG. 3 is a flowchart illustrating steps for creating the resultant file system during the clone operation only in locations within the boundaries that do not contain in-place file system objects to be preserved, according to some embodiments of the present invention.

The cloning manager 101 creates the resultant file system 107 during the clone operation only in locations within the boundaries 105 that do not contain in-place file system objects 103 to be preserved. FIG. 3 illustrates this process according to some embodiments of the present invention. Before allocating a sector or sector range for the creation of the resultant file system 107, the cloning manager 101 checks the preserved file system object 103 locations contained in the stored metadata 117, in order to determine 301 whether content of a file system object 103 to be preserved is stored at the allocation location. If the location contains a preserved object 103, the cloning manager 101 allocates 303 the sector(s) to the file system 107 at another location, specifically an available, non-conflicting one. If there is no location conflict, the cloning manager simply allocates 305 the sector(s) at the location.

Once the resultant file system 107 has been created, the cloning manager 101 can delete the metadata 117 concerning the file system objects 103 to be preserved, and, in relevant embodiments, erase the persistence data.

In some embodiments of the present invention, the cloning manager 101 additionally supports incorporating preserved file system objects 103 into the resultant file system 107, as desired. In such embodiments all in-place file system objects 103 to be preserved are preserved during the clone operation, and optionally can also be added into the file system 107 created by the clone operation. An example of a file system object 103 that may be preserved for the duration of the clone operation but not subsequently incorporated into the resultant file system 107 is a source clone image file that is not required on the resultant file system 107 following the successful completion of the clone operation.

Figure 4:
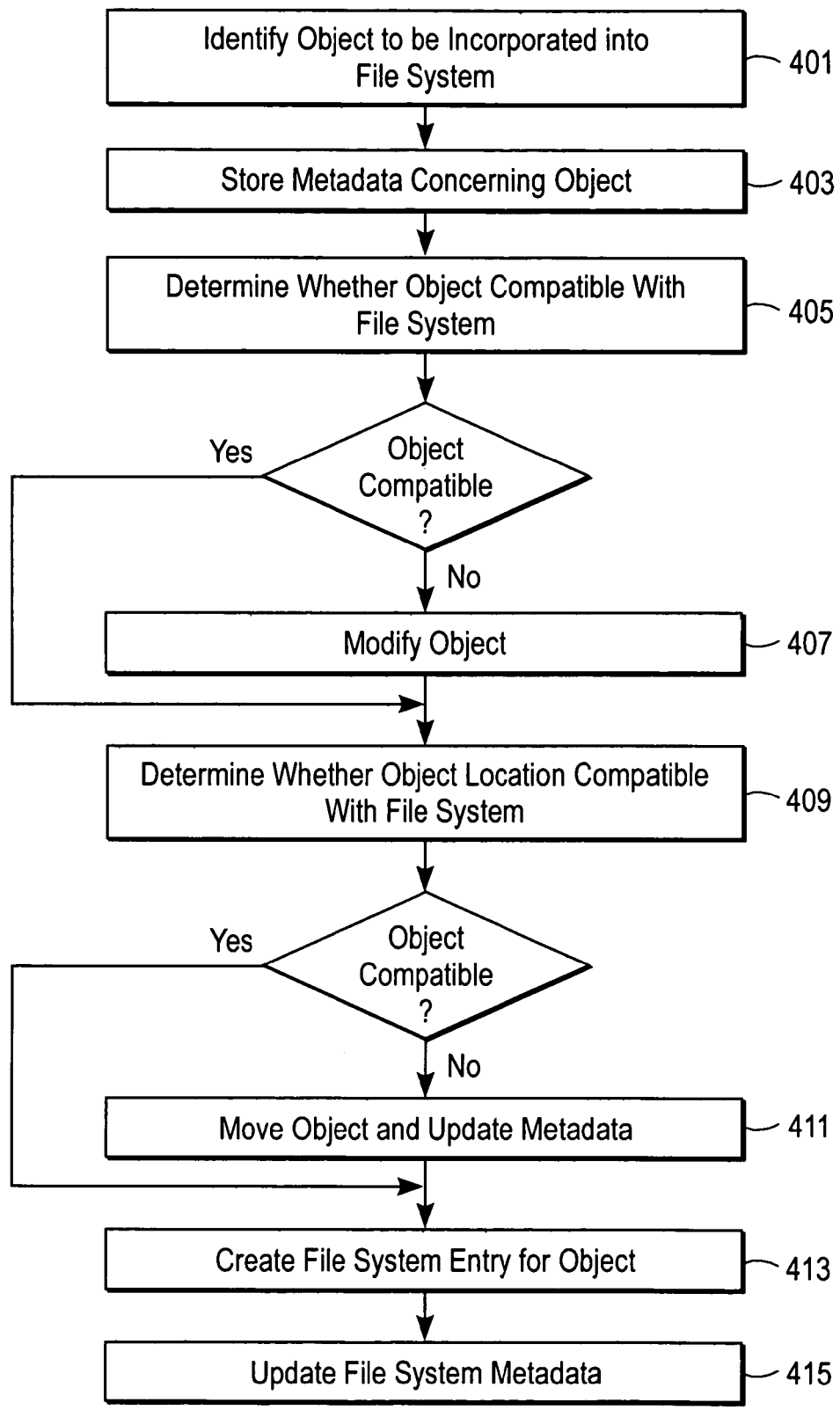
FIG. 4 is a flowchart illustrating steps for processing file system objects to be incorporated into the resultant file system, according to some embodiments of the present invention.

FIG. 4 illustrates steps for processing file system objects 103 to be incorporated into the resultant file system 107, according to some embodiments of the present invention. The cloning manager 101 identifies 401 at least one in-place file system object 103 to be both preserved during the clone operation and incorporated into the file system 107 created by the clone operation. Such objects 103 can be identified by directives to the cloning manager 101 concerning the clone operation.

For such objects 103, in addition to storing the metadata 117 concerning file system objects 103 be preserved as described above, the cloning manager also stores 403 additional metadata 117 to identify the object 103 as one to be incorporated into the resultant file system 107, and to enable such incorporation. Typically, this additional metadata 117 can include an indication that the object 103 is to be recovered into the resultant file system 107, the object's 103 recovery path within the resultant file system 107 and the object's 103 recovery partition within the set of resultant file systems in the case where multiple file systems will result from the clone operation. Note that because the cloning manager 101 can, but need not, store the object 103 with a new directory path or with a new file name in the resultant file system 107.

Because the resultant file system 107 need not be of the file system 107 type of the in-place objects 103, the cloning manager 101 determines 405 whether the objects to be recovered are compatible with the resultant file system 107. For example, an object 103 could be too large for the resultant file system 107 type or the object 103 could be encrypted and/or compressed and the resultant file system 107 might be of a type that does not support such features, etc.

In some embodiments for at least some types of incompatible objects 103, the cloning manager modifies 407 incompatible objects 103 so as to be compatible with the resultant file system (e.g., decrypts encrypted objects 103, decompresses compressed objects 103, etc.), as illustrated in FIG. 4. In other embodiments, the cloning manager 101 classifies an incompatible object as an error condition (not illustrated), which can be processed as desired (e.g., by displaying a subsequent error message or user warning).

In addition to the steps described above for preserving file system objects 103 during the clone operation, the cloning manager 101 performs additional steps for objects 103 to be incorporated into the resultant file system 107. For each identified in-place file system object 103 to be incorporated into the resultant file system 107, the cloning manager 101 determines 409 whether its content resides within a location that is to be a data area of the resultant file system 107, and whether its location is properly aligned according to the storage geometry of the resultant file system 107 (e.g., whether the object's 103 content location is properly aligned with respect to cluster alignment within the data area for the resultant file system 107).

If the cloning manager 101 determines 409 that there is a location conflict for any object 103 to be recovered, the cloning manager moves 411 the object (i.e., shifts its location) to a location that is compatible with the resultant file system 107, and updates the metadata concerning the object 103 accordingly. In some embodiments (not illustrated), instead of moving 411 the object 103, the cloning manager classifies the location conflict as an error condition. This approach can be used with file system objects 103 containing data that can not be shifted from a specific storage location.

After the clone operation, the cloning manager 101 uses the metadata 117 concerning the preserved file system objects 103 to be incorporated into the resultant file system 107 to create 413 directory entries in the resultant file system 107 at the appropriate recovery path locations for each such object 103. The cloning manager 101 also updates 415 the resultant file system's 107 metadata in order to map the content locations of the recovered objects 103 into the resultant file system 107, thereby incorporating the recovered objects 103 therein.

For the purposes of readability, this specification describes file system object 103 preservation for clone operations targeting file systems 107 stored on a single storage medium 111 (including single disks visible in multi-disk hardware RAID systems). As will be apparent to those of ordinary skill in the relevant art in light of this specification, in some embodiments the cloning manager 101 executes similar clone operations targeting multiple (or apparent multiple) storage media 111.

As will be understood by those familiar with the art, the invention may be embodied in other specific forms without departing from the spirit or essential characteristics thereof. Likewise, the particular naming and division of the modules, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of these. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system, environment or file system. Accordingly, the disclosure of the present invention is intended to be illustrative, but not limiting, of the scope of the invention, which is set forth in the following claims.

What is claimed is:

1. A computer implemented method for in-place preservation of file system objects during a clone operation, the method comprising the steps of:
   a cloning manager determining boundaries on a target storage medium the boundaries to completely contain a resultant file system to be created by the clone operation;
   the cloning manager identifying at least one protected area within the boundaries, the protected area to be overwritten by the clone operation with a portion of the resultant file system;
   the cloning manager identifying at least one in-place file system object at least partially within the boundaries, the in-place file system object not to be overwritten during the clone operation;
   the cloning manager storing, in a location that will not be affected by the clone operation, metadata concerning each in-place file system object at least partially within the boundaries;
   the cloning manager ensuring that each in-place file system object at least partially within the boundaries is not located in a protected area; and
   the cloning manager performing the clone operation, the clone operation comprising creating the resultant file system only in locations within the boundaries in which no in-place file system object is located.

2. The method of claim 1 wherein the cloning manager determining the boundaries comprises:
   the cloning manager analyzing data concerning the clone operation to determine at least one attribute concerning the resultant file system to be created from a group of attributes consisting of:
      a file system type of the resultant file system to be created;
      a location of volume boundaries of the resultant file system to be created;
      storage geometry concerning the resultant file system to be created; and
      a number of total sectors to be used by the resultant file system to be created.

3. The method of claim 1 wherein the cloning manager identifying at least one protected area within the boundaries comprises the cloning manager performing at least one step from a group of steps consisting of:
   identifying at least one protected area required by the resultant file system to be created by the clone operation; and
   identifying at least one protected area not required by but optimally reserved for the resultant file system to be created by the clone operation.

4. The method of claim 1 wherein the cloning manager identifying at least one in-place file system object comprises:
   the cloning manager compiling a list of in-place file system objects not to be overwritten during the clone operation; and
   the cloning manager eliminating any in-place file system objects which will not be affected by the clone operation from the list.

5. The method of claim 4 wherein the cloning manager eliminating any in-place file system objects which will not be affected by the clone operation from the list further comprises:
   the cloning manager identifying at least one in-place file system object which is located outside of the boundaries; and
   the cloning manager eliminating each identified in-place file system object which is located outside of the boundaries from the list.

6. The method of claim 1 wherein the cloning manager storing metadata concerning each in-place file system object further comprises:
   the cloning manager storing, for each in-place system object, at least one metadatum concerning the in-place file system object from a group of metadata consisting of:
      a path of the in-place file system object;
      at least one attribute concerning the in-place file system object; and
      a logical location of the in-place file system object;
      a physical storage location of content of the in-place file system object.

7. The method of claim 1 wherein the cloning manager storing metadata concerning each in-place file system object further comprises:
   the cloning manager storing the metadata in a location that will not be affected by the clone operation in a format from a group of formats consisting of:
      at least two files, each file containing the metadata so as to support fault tolerance;
      at least one record in a database supporting fault tolerance;
      a single file; and
      structured data in random access memory.

8. The method of claim 1 wherein the cloning manager ensuring that each in-place file system object at least partially within the boundaries is not located in a protected area comprises:
   the cloning manager comparing a location of each in-place file system object at least partially within the boundaries to locations of identified protected areas; and
   responsive to the cloning manager determining that a location of an in-place file system object conflicts with a location of a protected area, the cloning manager performing a step from a group of steps consisting of:
      moving the conflicting in-place file system object to an available non-conflicting location, and updating metadata concerning the in-place file system object accordingly; and
      classifying the result of the determination as an error condition.

9. The method of claim 1 wherein the clone operation further comprises:
  before allocating at least one sector for the creation of the resultant file system, checking the stored metadata concerning the in-place file system objects to determine if at least one in-place file system object is located at that location; and
  responsive to determining that at least one in-place file system object is located at that location, allocating the at least one sector to the resultant file system at an available non-conflicting location.

10. The method of claim 1 wherein:
  the cloning manager identifying at least one in-place file system object at least partially within the boundaries further comprises the cloning manager identifying at least one in-place file system object to be incorporated into the resultant file system created by the clone operation; and
  wherein the cloning manager storing, in a location that will not be affected by the clone operation, metadata concerning each in-place file system object further comprises the cloning manager storing metadata concerning each identified in-place file system object to be incorporated into the resultant file system created by the clone operation, the metadata comprising at least one metadatum from a group of metadata consisting of:
    an indication that the in-place file system object is to be incorporated in the resultant file system to be created by the clone operation;
    a recovery path of the in-place file system object within the resultant file system to be created by the clone operation; and
    a recovery partition of the in-place file system object within the resultant file system to be created by the clone operation.

11. The method of claim 10 further comprising:
  the cloning manager determining that at least one identified in-place file system object to be incorporated into the resultant file system to be created by the clone operation is not compatible with the resultant file system to be created by the clone operation; and
  responsive to the determination, the cloning manager performing a step from a group of steps consisting of:
    modifying at least one identified in-place file system object to be compatible with the resultant file system to be created by the clone operation; and
    classifying the identification as an error condition.

12. The method of claim 10 further comprising:
  for each identified in-place file system object to be incorporated into the resultant file system, the cloning manager determining whether its content is located within a location that is to be a data area of the resultant file system, and whether its location is aligned according to storage geometry of the resultant file system; and
  responsive to determining that the location of at least one in-place file system object to be incorporated into the resultant file system is not compatible with the resultant file system, the cloning manager performing a step from a group of steps consisting of:
    moving the in-place file system object such that its new location is compatible with the resultant file system and updating the associated metadata accordingly; and
    classifying the result of the determination as an error condition.

13. The method of claim 10 further comprising the cloning manager performing the following additional steps after the clone operation:
  using stored metadata to create a directory entry in the resultant file system for each identified in-place file system object to be incorporated into the resultant file system; and
  updating metadata concerning the resultant file system to map the content location of each identified in-place file system object into the resultant file system.

14. The method of claim 1 further comprising:
  the cloning manager determining whether target storage medium is of sufficient size to store each identified in-place file system object and the resultant file system to be created by the clone operation;
  responsive to the result of the determining step, the cloning manager performing a step from a group of steps consisting of:
    responsive to determining that the target storage medium is of sufficient size, proceeding with the clone operation; and
    responsive to determining that the target storage medium is not of sufficient size, classifying the result of the determination as an error condition.

15. The method of claim 1 further comprising:
  the cloning manager creating at least two file systems during the clone operation.

16. The method of claim 1 further comprising:
  the cloning manager creating at least one file system during the clone operation on at least two target storage media.

17. A computer program product comprising:
  a computer readable medium storing executable code for in-place preservation of file system objects during a clone operation, the code comprising:
  program code for determining boundaries on a target storage medium, the boundaries to completely contain a resultant file system to be created by the clone operation;
  program code for identifying at least one protected area within the boundaries, the protected area to be overwritten by the clone operation with a portion of the resultant file system;
  program code for identifying at least one in-place file system object at least partially within the boundaries, the in-place file system object not to be overwritten during the clone operation;
  program code for storing, in a location that will not be affected by the clone operation, metadata concerning each in-place file system object at least partially within the boundaries;
  program code for ensuring that each in-place file system object at least partially within the boundaries is not located in a protected area; and
  program code for performing the clone operation, the clone operation comprising creating the resultant file system only in locations within the boundaries in which no in-place file system object is located.

18. The computer program product of 17 wherein the program code for determining the boundaries comprises:
  program code for analyzing data concerning the clone operation to determine at least one attribute concerning the resultant file system to be created from a group of attributes consisting of:
    a file system type of the resultant file system to be created;

a location of volume boundaries of the resultant file system to be created;

storage geometry concerning the resultant file system to be created; and a number of total sectors to be used by the resultant file system to be created.

19. The computer program product of claim 17 wherein the program code for identifying at least one protected area within the boundaries further comprises at least one program code from a group of program codes consisting of:

program code for identifying at least one protected area required by the resultant file system to be created by the clone operation; and program code for identifying at least one protected area not required by but optimally reserved for the resultant file system to be created by the clone operation.

20. The computer program product of claim 17 wherein the program code for storing metadata concerning each in-place file system object further comprises:

program code for storing, for each in-place system object, at least one metadatum concerning the in-place file system object from a group of metadata consisting of:
a path of the in-place file system object;
at least one attribute concerning the in-place file system object; and
a logical location of the in-place file system object;
a physical storage location of content of the in-place file system object.

21. The computer program product of claim 17 wherein the program code for storing metadata concerning each in-place file system object further comprises:

program code for storing the metadata in a location that will not be affected by the clone operation in a format from a group of formats consisting of:
at least two files, each file containing the metadata so as to support fault tolerance;
at least one record in a database supporting fault tolerance;
a single file; and
structured data in random access memory.

22. The computer program product of claim 17 wherein the program code for ensuring that each in-place file system object at least partially within the boundaries is not located in a protected area comprises:

program code for comparing a location of each in-place file system object at least partially within the boundaries to locations of identified protected areas; and at least one program code for from a group of program codes consisting of:
program code for, responsive to determining that a location of a in-place file system object conflicts with a location of a protected area, moving the conflicting in-place file system object to an available non-conflicting location, and updating metadata concerning the in-place file system object accordingly; and
program code for, responsive to determining that a location of a in-place file system object conflicts with a location of a protected area, classifying the result of the determination as an error condition.

23. The computer program product of claim 17 wherein the program code for creating the file system during the clone operation only in locations within the boundaries in which no in-place file system object is located further comprises:

program code for, before allocating at least one sector for the creation of the resultant file system, checking the stored metadata concerning the in-place file system objects to determine if at least one in-place file system object is located at that location; and program code for, responsive to determining that at least one in-place file system object is located at that location, allocating the at least one sector to the resultant file system at an available non-conflicting location.

24. The computer program product of claim 17 wherein:

the program code for identifying at least one in-place file system object at least partially within the boundaries further comprises program code for identifying at least one in-place file system object to be incorporated into the resultant file system created by the clone operation; and wherein the program code for storing, in a location that will not be affected by the clone operation, metadata concerning each in-place file system object further comprises program code for storing metadata concerning each identified in-place file system object to be incorporated into the resultant file system created by the clone operation, the metadata comprising at least one metadatum from a group of metadata consisting of:
an indication that the in-place file system object is to be incorporated in the resultant file system to be created by the clone operation;
a recovery path of the in-place file system object within the resultant file system to be created by the clone operation; and
a recovery partition of the in-place file system object within the resultant file system to be created by the clone operation.

25. The computer program product of claim 24 further comprising:

program code for determining, for each identified in-place file system object to be incorporated into the resultant file system, whether its content is located within a location that is to be a data area of the resultant file system, and whether its location is aligned according to storage geometry of the resultant file system; and at least one program code from a group of program codes consisting of:
program code for, responsive to determining that the location of at least one in-place file system object to be incorporated into the resultant file system is not compatible with the resultant file system, moving the in-place file system object such that its new location is compatible with the resultant file system and updating the associated metadata accordingly; and
program code for, responsive to determining that the location of at least one in-place file system object to be incorporated into the file system is not compatible with the file system, classifying the result of the determination as an error condition.

26. The computer program product of claim 24 further comprising:

program code for using stored metadata to create a directory entry in the resultant file system for each identified in-place file system object to be incorporated into the resultant file system; and program code for updating metadata concerning the resultant file system to map the content location of each identified in-place file system object into the resultant file system.

27. A computer system for in-place preservation of file system objects during a clone operation, the computer system comprising
a processor; and a computer-readable memory containing a computer program product executable on the processor, the computer program product further comprising:

a software portion configured to determine boundaries on a target storage medium, the boundaries to completely contain a resultant file system to be created by the clone operation;

a software portion configured to identify at least one protected area within the boundaries, the protected area to be overwritten by the clone operation with a portion of the resultant file system;

a software portion configured to identify at least one in-place file system object at least partially within the boundaries, the in-place file system object not to be overwritten during the clone operation;

a software portion configured to store, in a location that will not be affected by the clone operation, metadata concerning each in-place file system object at least partially within the boundaries;

a software portion configured to ensure that each in-place file system object at least partially within the boundaries is not located in a protected area; and a software portion configured to perform the clone operation, the clone operation comprising creating the resultant file system only in locations within the boundaries in which no in-place file system object is located.

28. The computer system of 27 wherein the software portion configured to determine the boundaries comprises:

a software portion configured to analyze data concerning the clone operation to determine at least one attribute concerning the resultant file system to be created from a group of attributes consisting of:

a file system type of the resultant file system to be created;

a location of volume boundaries of the resultant file system to be created;

storage geometry concerning the resultant file system to be created; and a number of total sectors to be used by the resultant file system to be created.

29. The computer system of claim 27 wherein the software portion configured to identify at least one protected area within the boundaries further comprises at least one software portion from group of software portions consisting of:

a software portion configured to identify at least one protected area required by the resultant file system to be created by the clone operation; and a software portion configured to identify at least one protected area not required by but optimally reserved for resultant the file system to be created by the clone operation.

30. The computer system of claim 27 wherein the software portion configured to store metadata concerning each in-place file system object further comprises:

a software portion configured to store, for each in-place system object, at least one metadatum concerning the in-place file system object from a group of metadata consisting of:

a path of the in-place file system object;

at least one attribute concerning the in-place file system object; and a logical location of the in-place file system object;

a physical storage location of content of the in-place file system object.

31. The computer system of claim 27 wherein the software portion configured to store metadata concerning each in-place file system object further comprises:

a software portion configured to store the metadata in a location that will not be affected by the clone operation in a format from a group of formats consisting of:

at least two files, each file containing the metadata so as to support fault tolerance;

at least one record in a database supporting fault tolerance;

a single file; and structured data in random access memory.

32. The computer system of claim 27 wherein the software portion configured to ensure that each in-place file system object at least partially within the boundaries is not located in a protected area comprises:

a software portion configured to compare a location of each in-place file system object at least partially within the boundaries to locations of identified protected areas; and at least one software portion from a group of software portions consisting of:

a software portion configured to move, responsive to determining that a location of an in-place file system object conflicts with a location of a protected area, the conflicting in-place file system object to an available non-conflicting location, and to update metadata concerning the in-place file system object accordingly; and a software portion configured to classify, responsive to determining that a location of a in-place file system object conflicts with a location of a protected area, the result of the determination as an error condition.

33. The computer system of claim 27 wherein the software portion configured to create the file system during the clone operation only in locations within the boundaries in which no in-place file system object is located further comprises:

a software portion configured to check, before allocating at least one sector for the creation of the resultant file system, the stored metadata concerning the in-place file system objects to determine if at least one in-place file system object is located at that location; and a software portion configured to allocate, responsive to determining that at least one in-place file system object to be preserved is located at that location, the at least one sector to the resultant file system at an available non-conflicting location.

34. The computer system of claim 27 wherein:

the software portion configured to identify at least one in-place file system object at least partially within the boundaries further comprises a software portion configured to identify at least one in-place file system object to be incorporated into the resultant file system created by the clone operation; and wherein the software portion configured to store, in a location that will not be affected by the clone operation, metadata concerning each in-place file system object further comprises a software portion configured to store metadata concerning each identified in-place file system object to be incorporated into the resultant file system created by the clone operation, the metadata comprising at least one metadatum from a group of metadata consisting of:

an indication that the in-place file system object is to be incorporated in the resultant file system to be created by the clone operation;

a recovery path of the in-place file system object within the resultant file system to be created by the clone operation; and a recovery partition of the in-place file system object within the resultant file system to be created by the clone operation.

35. The computer system of claim 34 further comprising:

a software portion configured to determine, for each identified in-place file system object to be incorporated into the resultant file system, whether its content is located within a location that is to be a data area of the resultant file system, and whether its location is aligned according to storage geometry of the resultant file system; and at least one software portion from a group of software portions consisting of:

a software portion configured to move, responsive to determining that the location of at least one in-place file system object to be incorporated into the resultant file system is not compatible with the resultant file system, the in-place file system object such that its new location is compatible with the resultant file system and updating the associated metadata accordingly; and a software portion configured to classify, responsive to determining that the location of at least one in-place file system object to be incorporated into the resultant file system is not compatible with the resultant file system, the result of the determination as an error condition.

36. The computer system of claim 34 further comprising:

a software portion configured to use stored metadata to create a directory entry in the resultant file system for each identified in-place file system object to be incorporated into the resultant file system; and a software portion configured to update metadata concerning the resultant file system to map the content location of each identified in-place file system object into the resultant file system.

* * * * *